(12) United States Patent
Goss

(10) Patent No.: US 10,731,692 B2
(45) Date of Patent: *Aug. 4, 2020

(54) SCREW HEAD AND TOOL FOR USE THEREWITH

(71) Applicant: Ttapdrive AS, Kristiansand (NO)

(72) Inventor: David C. Goss, Rockford, IL (US)

(73) Assignee: TTAPDRIVE AS (NO)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,877

(22) Filed: Jan. 21, 2013

(65) Prior Publication Data

US 2014/0060268 A1    Mar. 6, 2014

Related U.S. Application Data

(63) Continuation-in-part of application No. PCT/IB2012/053740, filed on Jul. 23, 2012.
(Continued)

(30) Foreign Application Priority Data

Aug. 25, 2011 (GB) ..................................... 111469.7

(51) Int. Cl.
*F16B 23/00* (2006.01)
*B25B 15/00* (2006.01)
(Continued)

(52) U.S. Cl.
CPC ............ *F16B 23/003* (2013.01); *B21K 1/463* (2013.01); *B25B 15/004* (2013.01);
(Continued)

(58) Field of Classification Search
CPC ..... B25B 23/00; B25B 15/005; B25B 23/003; B25B 23/0053; B25B 23/108
(Continued)

(56) References Cited

U.S. PATENT DOCUMENTS 2,397,216 A * 3/1946 Stellin ................. F16B 23/0007
411/404
3,723,442 A * 3/1973 Nakanishi ............ C07D 498/10
514/823
(Continued)

FOREIGN PATENT DOCUMENTS

GB          2437537 A     10/2007
WO      WO01/77538 A    10/2007

*Primary Examiner* — David B. Thomas
(74) *Attorney, Agent, or Firm* — Clark Hill PLC; James R. Foley

(57) ABSTRACT

The invention provides a screw in which the screw head (1) has a slot (2) in the upper surface of the screw head, an upper peripheral wall (9) of regular planform extending down from the rim of the slot into the screwhead, the upper peripheral wall (9) being generally aligned with the axis of the screw to form a recess (3), a sloping transition surface (15), extending downwardly and inwardly with respect to the lower edge of the upper peripheral wall (9), and a further recess (11) extending downwardly from the lower edge of the sloping transition surface (15), in which the dimensions of the screw head are such that when the screwhead is engaged by a tool (6) having upper (16) and lower (17) engagement sections, and in which the upper engagement section (16) extends downwardly with respect to the axis of the screw to which the tool is to engage and the lower engagement section (17) extends further downwardly, and in which there is at least one protrusion (or rib) (21) on the inside wall (12) of the further recess (11), so that there is a 'stick fit' between the protrusion (21) on the inside wall (12) of the further recess (11) and the lower engagement section (17) of the tool (6).

16 Claims, 3 Drawing Sheets

Related U.S. Application Data

(60) Provisional application No. 61/510,915, filed on Jul. 22, 2011.

(51) Int. Cl.
  *B25B 23/10* (2006.01)
  *B21K 1/46* (2006.01)

(52) U.S. Cl.
  CPC .......... *B25B 15/005* (2013.01); *B25B 23/101* (2013.01); *B25B 23/105* (2013.01); *F16B 23/0053* (2013.01); *F16B 23/0069* (2013.01)

(58) Field of Classification Search
  USPC .......................................................... 81/460
  See application file for complete search history.

(56) References Cited

U.S. PATENT DOCUMENTS

| | | | |
|---|---|---|---|
| 3,972,083 A | 8/1976 | Dreger | |
| 6,951,158 B1 * | 10/2005 | Edland | 81/460 |
| 7,077,038 B2 * | 7/2006 | Toyooka | F16B 23/0023 |
| | | | 81/436 |
| 7,325,470 B2 * | 2/2008 | Kay | A61B 17/8615 |
| | | | 606/279 |
| 7,730,812 B2 * | 6/2010 | Edland | B25B 15/005 |
| | | | 411/404 |
| 7,963,732 B2 * | 6/2011 | Stager | F16B 25/0015 |
| | | | 411/310 |
| 8,739,660 B2 * | 6/2014 | Edland et al. | 81/460 |
| 2005/0098000 A1 | 5/2005 | Brooks | |
| 2005/0172761 A1 * | 8/2005 | Brooks | 81/439 |
| 2010/0269644 A1 * | 10/2010 | Edland et al. | 81/460 |

\* cited by examiner

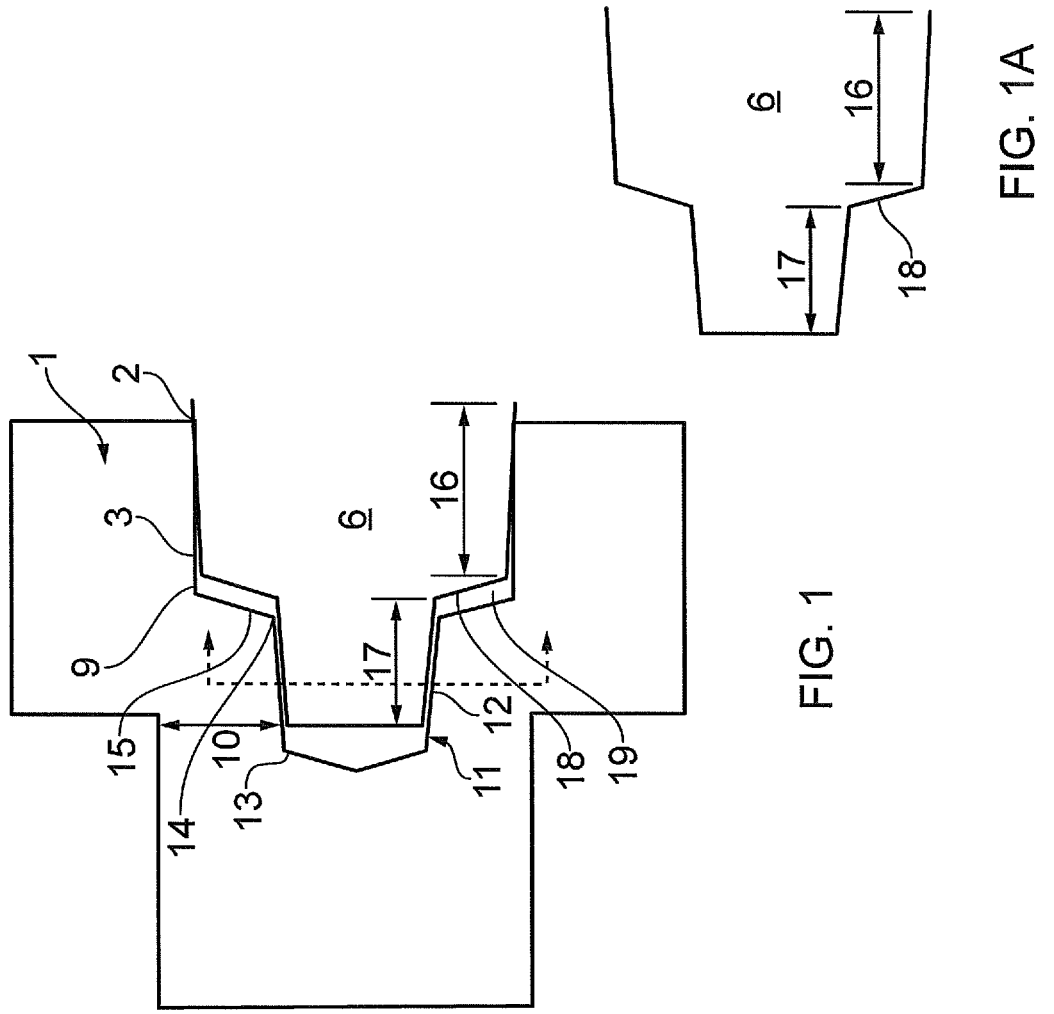
FIG. 1A
FIG. 1
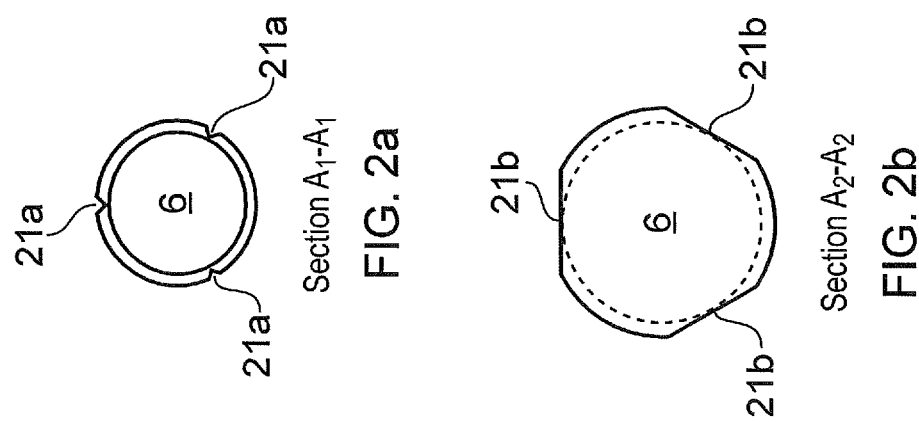
Section $A_1$-$A_1$
FIG. 2a
Section $A_2$-$A_2$
FIG. 2b Section B₁-B₁

Section B₂-B₂

SECTION D-D

SECTION C-C

SCREW HEAD AND TOOL FOR USE THEREWITH

CROSS-REFERENCE TO RELATED APPLICATIONS

This application is a Continuation-in-Part of International application PCT/IB/2012/053740, filed 23 Jul. 2012, which claims the benefit under 35 USC § 119 to U.S. provisional application 61/510,915 filed 22 Jul. 2011, and claims priority from GB 1114691.7 filed 25 Aug. 2011.

TECHNICAL FIELD OF THE INVENTION

The invention relates to a system for driving screws, and is concerned with a screw and with a tool first to hold and then to drive a screw into a backing material.

The invention is applicable to any screws having screw heads with straight paraxial sidewall recesses as well as to screws having near straight axial sidewall recesses. In particular (but without limitation) the invention is concerned with a screw head having a hexalobular slot in its upper surface, and with a tool for use with this screw head. The tool and the screw head together comprise a system for fixing screws.

BACKGROUND TO THE INVENTION

As an improvement over the straight slot on conventional screw heads, the Torx™ slot was developed. This had the general shape of a star and extended downwardly into the screw head, giving better engagement characteristics than the straight slot. Other screws had shaped recesses in their screw heads and had straight or near straight sidewalls. Examples are Phillips, Hex or Spline headed screws. A tool (screwdriver) of complementary shape was used to drive the screw into whatever backing material was appropriate. If the shaped slot extended too far downwardly into the head of the screw, the lowest parts of the extremities of the slot could approach the undersurface of the screw head. For instance the shaped slot might approach the external conical undersurface of a countersunk screw, so as to weaken the screw head. Several systems have been developed to overcome this and other disadvantages.

Examples of two such systems are shown in two earlier patents with which the present applicant was associated. These are U.S. Pat. Nos. 6,951,158 and 7,730,812. U.S. Pat. No. 6,951,158 gives a detailed review of the prior art which will not be repeated.

In specification U.S. Pat. No. 7,730,812 there is a screw head having a hexalobular slot in its upper surface. The curved wall of the slot is approximately parallel to the axis of the screw throughout its length, and may be tapered downwardly inward at an angle which may typically be 1.5 deg. At the base of the hexalobular slot there is a downwardly and inwardly tapered transition surface, leading to further a central recess of smaller diameter. This smaller further recess has tapered walls. Practical experience has led to the use of more broadly tapered walls, which may be tapered downwardly at between 6 deg and 12 deg, and for instance at 10.8333 deg to the axis of the screw, typically between 6.5 deg and 7.5 deg and preferably at 7.5 deg.

The intention of the further recess was to promote the accurate insertion of an appropriately shaped tool (screwdriver) within the hexalobular slot of the screw head. Engagement of a central end point of tapered circular cross section on the tip of the tool into the further recess allowed the screw to be retained on the tool while a craftsman manoeuvred the screw into position.

Retention of the screw on the tool by press engagement is particularly useful on one-handed power tools and for robotic tools.

Other screw and tool systems are known to have been manufactured and marketed. Examples are the 'anti cam out' ACR™ system and the Ribbed Phillips™ 'anti-cam out' rib system. These systems have a drive system with ribs, but in these examples the ribs extend down into the screw heads in one unbroken length, and have no transition slopes within the screw head recesses.

The present invention is intended to make a significant improvement inter alia on the system disclosed in U.S. Pat. No. 7,730,812.

SUMMARY OF THE INVENTION

The invention provides a screw in which the screw head has a slot in the upper surface of the screw head, an upper peripheral wall of regular planform extending down from the rim of the slot into the screwhead, the upper peripheral wall being generally aligned with the axis of the screw to form a recess, a sloping transition surface extending downwardly and inwardly with respect to the lower edge of the upper peripheral wall, and a further recess extending downwardly from the lower edge of the sloping transition surface, in which the dimensions of the screw head are such that when the screwhead is engaged by a tool having upper and lower engagement sections, and in which the upper engagement section extends downwardly with respect to the axis of the screw to which the tool is to engage and the lower engagement section extends further downwardly, and in which there is at least one protrusion, for example a rib or a flat element, on the inside wall of the further recess, so that there is a stick fit due to friction between the protrusion on the inside wall of the further recess and the lower engagement section of the tool. That there is a stick fit between the tool and the screw entails that the protrusion on the inside wall of the further recess will cause sufficient friction between the tool and the screw such that the screw does not fall off the tool.

In one form the protrusion is helical, and is disposed on the inside wall of the further recess.

In another form the protrusion is straight, and is disposed on the inside wall of the further recess and is aligned with the axis of the screw.

In this other form, it is preferred that there are three protrusions arranged with 120 deg radial spacing between them.

The protrusions may extend for the full depth of the further recess.

The protrusions may extend in a direction in parallel to the axial direction of the screw or may extend in a direction in parallel to the circumferential direction of the screw.

It is preferred that the wall of the further recess is tapered downwardly inward towards the bottom of the further recess. It is further preferred that the taper is between 2.5 and 12.0 deg, (for instance at 10.8333 d) typically between 6.5 deg and 7.5 deg and preferably at 7.5 deg+−tolerances.

It is also preferred that the upper peripheral wall is tapered downwardly inward towards the upper edge of the sloping transition surface. It is further preferred that the taper is between 0.5 and 3 deg, typically between 1 and 2 deg and advantageously 1.5 deg.

In a preferred form the slot in the upper surface of the screw is hexalobular.

In yet another form the protrusion runs round the interior of the screw in a plane at right angles to the axis of the screw.

The invention also provides a tool bit for holding and driving a screw as described above, in which there is at least one protrusion (for instance a rib or a flat element) on an external surface of the engagement portion of the tool intended to engage the further recess, so rendering the protrusion on the corresponding portion of the screw head unnecessary. Preferably the tool has three equally spaced protrusions (or ribs). The discussion above about the shape and extension of the protrusions also applies here. Thus the protrusions may extend helically around the tool in the in the axial direction of the tool or in its circumferential direction.

The invention also provides a system comprising a screw as described above in combination with a tool as described above.

The invention also provides a punch pin for forming protrusions in the wall of the screw as described above.

BRIEF DESCRIPTION OF THE DRAWINGS

A diagrammatic example and one specific embodiment of the invention will now be described by way of example with reference to the accompanying drawings, in which:

FIG. 1 is a diagram illustrating a tool bit and screw head recess with protrusions;

FIG. 1a is a detailed view from FIG. 1

FIG. 2a is a cross section on line A1-A1 in FIG. 1 in accordance with a first embodiment of the protrusions;

FIG. 2b is a cross section on line A2-A2 in FIG. 1 in accordance with a second embodiment of the protrusions;

FIG. 4a is a cross section on line B1-B1 in FIG. 3a;

DETAILED DESCRIPTION OF THE EMBODIMENTS OF THE INVENTION

Figure 5:
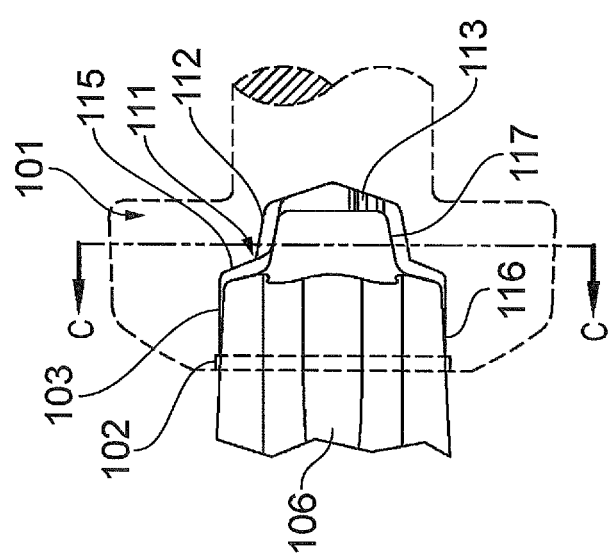
FIG. 5 is a detailed side view of a specific embodiment showing a bit engaging in the head of a screw.

As shown diagrammatically in FIG. 1, a screw head 1 has a slot 2 in its upper surface. (The configuration of the slot is better shown in FIG. 5.) The slot 2 forms a straight sided recess 3 which has a cross section in a plane parallel to the upper surface of the screw head 1. The recess has outstanding points with engagement surfaces (not shown) on either side of the points. These points are intended for engagement by a tool 6 of corresponding shape to the straight sided recess 3.

The slot 2 has a further central recess 11 at the bottom of the straight sided six pointed recess 3. The further recess 11 is aligned with the axis of the screw, and so is centrally located therein. This further recess 11 has a circular cross section and a smaller diameter than the recess 3. Walls 12 of the further recess 11 are slightly inclined so that the bottom 13 of the further recess 11 has a diameter slightly smaller than that of an upper part 14 of the further recess 11. A sloping transition surface 15 is formed between the upper part 14 of the further recess 11 and the lower part of the walls 9 of the six pointed recess 3.

It will be understood that while the specific embodiment is concerned with a screw head having a six pointed recess 3, screws having recesses of many other regular shapes may incorporate protrusions according to the invention.

The tool 6 has an engagement section 16 that is designed to fit within the recess 3. The shape of the engagement section 16 in plan corresponds to the shape of the recess 3. The diameter of the engagement section may be uniform, or, as shown in FIG. 1, may be slightly tapered downwardly and inwardly towards its lower end. The taper may be 1.25 deg to 1.75 deg—typically 1.5 deg. The diameter of the engagement section 16 is sized to allow it to be inserted into the recess 3 without difficulty.

The tool 6 also has a central point 17 with a circular cross section extending downwardly from engagement section 16. The diameter of the central point 17 of the tool 6 is slightly smaller than that of the further recess 11 of the screw head 1. A sloping transition surface 18 on the tool 6 extends outwardly and upwardly from the central point 17 to the engagement section 16. The angle of inclination of the transition surface 18 is smaller than that of the transition surface 15. Thus a space 19 is formed between the surfaces 15 and 18 when the tool is inserted into the slot 2. The depth of the space 19 diverges towards the central point 17. The section 16 of the tool 6 may engage the upper periphery of the walls 9 of the recess 3 when the tool enters the slot 2. The central point (or pilot point) 17 may typically have a length shorter than the height of the recess 3, to enable the engagement section 16 of the tool 6 to enter the recess 3.

In the case of screws which have undergone surface coating for preservation purposes, the diverging space 19 allows any excess coating to collect in the space 19 without obstructing engagement between the tool 6 and the slot 2. If no space had been provided, excess coating residue might settle on the surface 15 and at the bottom 13 of the recess 11, and thereby prevent sufficient engagement between the tool 6 and the slot 2.

Press engagement between the central point 17 and the further recess 11, supported by the engagement section 16 of the tool 6 and the upper periphery of the wall 9, ensures that—due to friction, i.e. stick fit,—the screw can remain on the tool without falling off. This mode of engagement is particularly effective in reducing angular movement between the tool 6 and the screw head 1.

As shown in FIGS. 2a and 2b the present invention differs from the prior art in that the screw head 1 has three inward protrusions on the wall 12 of the further recess 11 of the screw head 1, the protrusions are shown as ribs 21a which stand out inwardly with respect to the wall 12 in FIG. 2a, and as flat elements 21b in FIG. 2b. It is possible to have more than three inward protrusions, but three protrusions are advantageously used to locate the screw head 1 on the tool 6.

Each flat element 21b comprises a chamfered flat surface, which seen in the circular cross section of the recess 11 forms a chord such as a straight line joining the ends of an arc, see FIG. 2b. The flat surface of the flat element 21b comprises a contact area between the individual protrusion and the tool 6. The flat surface of the flat element 21b is larger than the contact area between the individual rib 21a of FIG. 2a and the tool 6.

In a form not illustrated by way of a specific embodiment, but within the scope of the invention, there may be only one protrusion for instance a rib or a flat element. This may be formed straight on the wall of the further recess within the screw with its length aligned with the axis of the screw, or may be formed as a regular helix on the wall of the further recess within the screw.

Figure 4A:
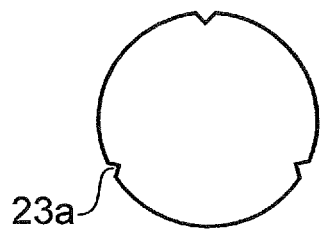
Figure 3A:
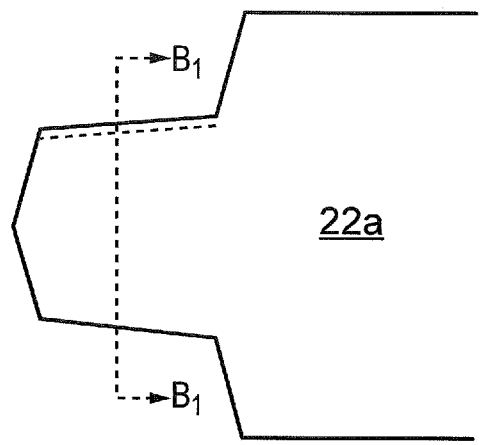
FIG. 3a is a diagram illustrating a punch pin to form protrusions in accordance with the first embodiment.
Figure 4B:
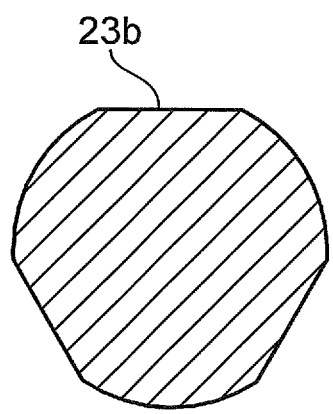
FIG. 4b is a cross section on line B2-B2 in FIG. 3b.
Figure 3B:
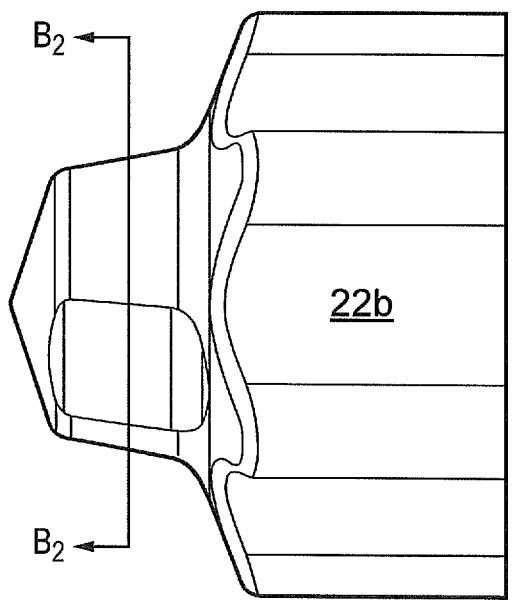
FIG. 3b is a diagram illustrating a punch pin to form protrusions in accordance with the second embodiment.
Figure 7:
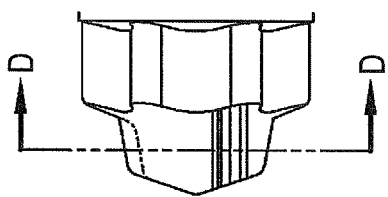
FIG. 7 is a side view of a punch pin.
Figure 8:
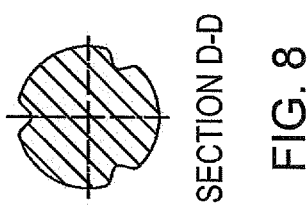
FIG. 8 is a cross section on line DD in FIG. 7.
Figure 6:
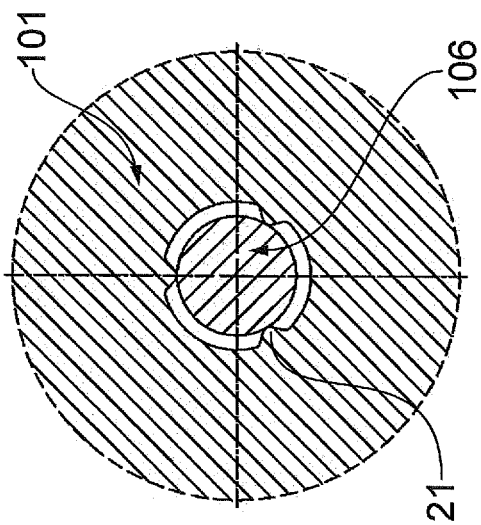
FIG. 6 is a cross section on line CC in FIG. 5.

FIGS. 3a and 4a illustrate a punch pin 22a to form the internal surface of the further recess 11 in the screw head 1 for producing protrusions such as ribs 21a. FIGS. 3b and 4b illustrate a punch pin 22b to form the internal surface of the further recess 11 in the screw head 1 to form protrusions such as flat elements 21b. The process to create protrusion cavities 23a, 23b on the punch pin starts with removal of material from a punch pin to create an oversized 'near net' pilot shape. Protrusion cavities can be extruded, machined or coined in some manner on the 'near net' pilot shape. Then material can be removed from the 'near net' pilot shape to create the final pilot shape. The punch pin therefore comprises at least one protrusion cavity 23a, 23b for forming of the at least one protrusion 21a, 21b on the inside wall 12 of the further recess 11. Consequently the punch pin will form protrusions in the further recess 11 in the screw head 1 of a screw during manufacturing of the screw.

More detailed drawings of a practical embodiment of the invention are now shown in FIGS. 5 to 8. Similar reference numerals are used for similar parts to those shown in FIGS. 1 and 2.

A screw head 101 has a hexalobular slot 102 in its upper surface, forming a straight sided six pointed recess 103 extending axially down into the screw head. The hexalobular shape of the slot 102 has outstanding points with engagement surfaces either side of these points. A further recess 111 of smaller cross section is centrally located on the axis of the screw, and deeper into the head of the screw than the recess 103. The wall 112 of the further recess 111 is slightly inclined, so that the further recess 111 is slightly tapered downwardly and inwardly toward the bottom 113 of that recess. A sloping transition surface 115 links the base of the recess 103 with the top of the further recess 111 of the screw head 101.

Hexalobular slots are internal driving features described in ISO 10664.

A tool 106 has an engagement surface 116 that is designed to fit within the hexalobular recess 103. The shape of the engagement surface 116 in plan corresponds to the shape of the recess 103. The engagement surface 116 is slightly tapered towards its lower end.

While the taper of the engagement surface may be within the range 0.5 deg to 3.5 deg, the taper is typically been between 1.25 deg and 1.75 deg, and advantageously a matter of 1.5 deg.

The central point 117 of the tool 106 is slightly tapered for engagement with the further recess 111 of the screw head 101. In the further central recess 111, there is a downwardly inward taper of just under 11 deg. (10.833). However, FEA studies may show that a 7.5 deg or steeper taper may give a better stick between the screw head and the tool.

Following the invention, the further recess 111 on screw head 101 has three inwardly facing protrusions here shown as ribs 121 on its inner surface. The protrusions may of course also be formed as flat elements as shown in FIG. 2b. These protrusions shown as ribs 121 are parallel to the axis of the screw, and engage with the outwardly facing wall of the central point 117 of the tool 106 creating a stick-fit engagement between the protrusions and the tool due to friction such that the screw can remain on the tool without falling off. This may best be seen in the cross section of FIG. 6. Provision of the protrusions (ribs or flat elements) gives the driving tool 106 a better engagement with the screw head 101. In embodiments of the invention not illustrated, there may be just one protrusion. In addition to being aligned with the axis of the screw, the protrusion may run helically on the inner surface of the further recess 111.

The heights of the protrusions may be from 5% to 25% of the diameter of the further recess 111. The protrusions may occupy from 1% to 10% of the perimeter, but smaller or larger proportions are possible.

The specific embodiment of the invention described above shows how the invention may be applied to one particular (hexalobular) form of screw head. However, many other screw heads may be provided with the protrusions as described with reference to the specific embodiment, and indeed the protrusions may be formed on the tool (screwdriver) used with those other screw heads.

For example, in the case of a Hex or Spline drive screw etc.

While preferred embodiments of the present invention are shown and described, it is envisioned that those skilled in the art may devise various modifications and equivalents without departing from the spirit and scope of the appended claims.

It may be noted that the engagement section 16 of the tool 6, which engages the six pointed recess 3, will transfer a torque from the tool to the screw. The further recess 11 is preferably provided with a generally circular cross section (when the protrusions 21 are not considered).

ADVANTAGES OF THE INVENTION

Protrusions on the inner surface of the recess pilot cavity are expected to improve press fit adhesion with the bit pilot because of the significantly increased contact pressures, so to improve a craftsman's confidence that a screw will stick to the tool.

Slight deformation of the protrusions will to some extent aid adhesion, with a similar effect.

Furthermore, protrusions will allow excess fastener coating to be displaced into adjacent regions upon bit insertion, thus reducing the negative effect of coating on adhesion.

The invention claimed is:

1. A screw with an axis and comprising a screw head (1) having a slot (2) in an upper surface of the screw head, wherein an upper peripheral wall (9) of regular planform extends down from a rim of the slot into the screw head, the upper peripheral wall (9) being generally aligned with the axis of the screw to form a recess (3), a sloping transition surface (15) extends downwardly and inwardly with respect to the lower edge of the upper peripheral wall (9), and a further recess (11) extends downwardly from a lower edge of the sloping transition surface (15), the further recess (11) comprising an inside wall (12), wherein the screw head is adapted for engagement with a tool (6) having an upper engagement section (16) for engagement with the upper peripheral wall (9), and a lower engagement section (17) for engagement with the further recess (11), and wherein at least one protrusion (21a, 21b) is provided on the inside wall (12) of the further recess (11), wherein the at least one protrusion (21a, 21b) comprises a plurality of spaced-apart protrusions (21a, 21b) that are spaced apart along the inside wall (12) of the further recess (11), wherein the screw is configured such that, at a cross-section, only the plurality of spaced-apart protrusions (21a, 21b) contact the tool (6) at the lower engagement section (17) in a stick fit at the cross-section while the lower engagement section (17) of the tool (6) is spaced away from the inside wall (12) of the further recess (11) at the cross-section at all other areas between the spaced-apart protrusions (21a, 21b) at the cross-section, wherein only the spaced-apart protrusions (21a, 21b) of the inside wall (12) of the further recess (11) contact the lower engagement section (17) of the tool (6) such that the screw remains on the tool (6) without falling off.

2. A screw as claimed in claim 1, in which the at least one protrusion is straight and is disposed on the inside wall (12) of the further recess (11) and is aligned with the axis of the screw.

3. A screw as claimed in claim 2, in which there are three protrusions arranged with 120 deg radial spacing between them.

4. A screw as claimed in claim 3, in which the protrusions extend for a full depth of the further recess (11).

5. A screw as claimed in claim 4, in which the at least one protrusion is a rib.

6. A screw as claimed in claim 4, in which the at least one protrusion is a flat element.

7. A screw as claimed in claim 5 or 6, in which the wall of the further recess (11) is tapered downwardly inward towards a bottom (13) of the further recess (11).

8. A screw as claimed in claim 7, in which the taper is between 2.5 and 12.0 deg.

9. A screw as claimed in claim 8 in which the taper is between 6.5 and 7.5 deg.

10. A screw as claimed in claim 9, in which the upper peripheral wall (9) is tapered downwardly inward towards an upper edge (14) of the sloping transition surface (15).

11. A screw as claimed in claim 10, in which the taper is between 1 and 3 deg.

12. A screw as claimed in claim 11, in which the taper is 1.5 deg.

13. A screw as claimed in claim 1, wherein the at least one protrusion is disposed in an interior of the screw in a plane at a right angle to the axis of the screw.

14. A screw as claimed in claim 1, in which the slot in the upper surface of the screw is hexalobular.

15. A screw as claimed in claim 1, wherein the at least one protrusion (21a, 21b) stands out inwardly with respect to the inside wall (12) of the further recess (11).

16. A screw as claimed in claim 1, wherein the at least one protrusion (21a, 21b) has a height, wherein the further recess (11) has a diameter, and wherein the height of the of the at least one protrusion (21a, 21b) is from 5-25% of the diameter of the further recess (11).

* * * * *